March 19, 1929.  B. W. JONES ET AL  1,706,169
CONTROL FOR DYNAMO ELECTRIC MACHINES
Filed Dec. 10, 1927
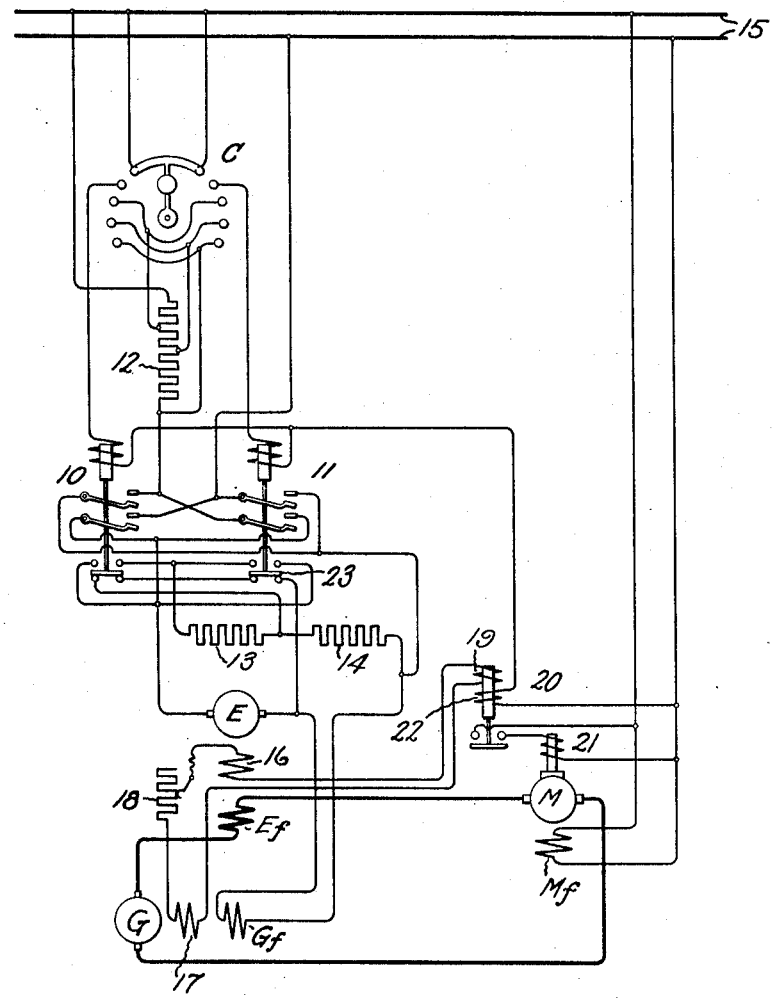
Inventors:
Benjamin W. Jones,
Charles B. Connely,
by *Alexander S. [illegible]*
Their Attorney.

Patented Mar. 19, 1929.

1,706,169

UNITED STATES PATENT OFFICE.

BENJAMIN W. JONES, OF SCHENECTADY, AND CHARLES B. CONNELY, OF BALLSTON, NEW YORK, ASSIGNORS TO GENERAL ELECTRIC COMPANY, A CORPORATION OF NEW YORK.

CONTROL FOR DYNAMO-ELECTRIC MACHINES.

Application filed December 10, 1927. Serial No. 239,019.

Our invention relates to improvements in the control of dynamo electric machines, and in particular the control of such machines whereby a nicety in the regulation of the operation of the machines is had to meet particular conditions.

Although the invention is not necessarily limited thereto, it has a particular application in Leonard drives for electric elevators. One of the problems arising in the control of electric elevators is that of effecting smooth acceleration and retardation characteristics for the motor driving the elevator. In the Leonard type of drive wherein the starting, stopping and speed regulation of the motor driving the elevator is accomplished through the manual manipulation of a controller which regulates the connection of the separately excited generator field winding to its source of supply and the variation of the energization of that winding, when the controller is manipulated rapidly to either effect an increase or a decrease of the elevator speed, undesirable acceleration and retardation characteristics are apt to be encountered. Furthermore, when the controller is manipulated so as to start the elevator by connecting the separately excited generator field winding to its source for energization of that winding in a direction corresponding to the intended direction of operation of the elevator, there is an initial relatively rapid rate of change of the flux set up by the generator separately excited field winding. Under certain conditions this relatively rapid rate of change is undesirable, in that excessive rushes of current in the motor armature are apt to occur. Also when the controller is manipulated so as to effect a relatively rapid decrease in the speed of the elevator, a relatively high rate of change of the generator field flux is occasioned, which in turn is also apt to produce excessive rushes of current in the motor armature circuit.

In a prior application for Letters Patent of the United States, Serial No. 704,059, filed April 3, 1924, Max A. Whiting has disclosed and broadly claimed a system of control for a Leonard drive particularly applicable as an elevator drive, in which the energization of the generator separately excited field winding is regulated in accordance with the load on the elevator motor so as to obtain a compounding effect whereby a smoothness in the operation of the elevator is had. The particular means disclosed by Whiting comprises an exciter having its armature included in series relation with the separately excited generator field winding, and itself excited by a field winding included in the armature circuit of the generator and motor of the Leonard drive. The field structure of this series exciter is designed so as to become saturated at a predetermined value of load current of the elevator driving motor so as to limit the further compounding of the generator of the Leonard drive and thus produce stable operating conditions. The regulating effect of the exciter is caused to have a proportionately greater effect in determining the voltage of the generator under load when the excitation of the generator separately excited field winding is initially adjusted so as to effect a comparatively low speed of the traction motor. In the said Whiting application there is also disclosed the provision of an electromagnetic switch for effecting the variation of the energization of the generator separately excited field winding in response to the rate of change of the flux set up by said winding so as to produce stable operating characteristics for the elevator driving motor.

Our invention has for one of its objects the elimination of the said electromagnetic switch of the Whiting system and the provision of an arrangement whereby the excitation of the exciter which regulates the separate excitation of the generator of a Leonard system is controlled in response to the rate of change of the field flux of the generator of the Leonard drive. There will thus be obtained a promptness in the response of the corrective characteristics tending to eliminate unstable operation of the elevator driving motor, since the variation in the excitation of the series exciter produces a prompt response in the variation of the energization of the separately excited field winding of the generator.

In elevator drives it is customary to provide a control in which the manually operable controller not only effects the starting and stopping of the elevator driving motor and the speed variation thereof, but also the control of the braking effect on the elevator driving motor. Thus, a common arrangement in a Leonard drive is to provide that the manually operable controller is connected with the electromagnetic normally applied friction brake for the elevator driving motor, so as to effect the release of this brake when the controller is operated so as to connect the generator separately excited field winding to a source of supply, and to effect the application of the brake when said field winding is disconnected from its source. It has heretofore been proposed to arrange the control in such a way that the final setting of the brake is dependent on the generated voltage of the driving motor. Such arrangements leave something to be desired, in that if the elevator is proceeding in the lowering direction, heavily loaded, the setting of the brake may be unduly prolonged. If the elevator is proceeding in the hoisting direction, heavily loaded, the brake will set too soon and cause a jerk in the stopping of the elevator.

One of the objects of our invention is to control the setting of the brake in response to the rate of change of the generator field flux in order to thereby obtain a setting of the brake such that for both hoisting and lowering operations, the brake will set at such a time as to produce a practically uniform rate of stopping.

For a better understanding of our invention reference is had to the accompanying drawing, which shows in a very simple diagram a preferred form of control for a Leonard drive in accordance with the invention.

Referring to the drawing, the Leonard drive therein shown comprises the generator G having a separately excited field winding $Gf$. This generator is intended to be driven in any suitable manner by some motor which maintains a substantially constant speed under load. The armature of the generator is included in a local circuit with the armature of the traction or driving motor M which has a separately excited field winding $Mf$. Included in the circuit of the generator field winding $Gf$ is the armature of the series exciter E, this exciter being preferably provided with a field winding $Ef$ which is included in the local circuit of the armatures of the generator and motor of the Leonard drive. The excitation of the exciter will thus be caused to vary responsively to the current in the armature circuit of the generator and motor of the drive and thus provide a regulating effect for the excitation of generator G to in turn regulate the speed of motor M. The exciter is driven in any suitable manner at a substantially constant speed.

A manual control for starting, stopping and regulating the speed of the motor M is provided, and this control includes the manually operable reversing controller C, which is effective to not only act as a master switch for controlling the opening and closing of the directional contactors 10 and 11, but also to vary the resistor 12 which is provided for obtaining a manual control of the speed of the traction motor M, by manually controlling the energization of the separately excited field winding $Gf$ of the generator. The field structure of the exciter is preferably designed so as to become saturated independently of the saturation of the field structure of the generator G so as to limit the compounding effect of the exciter. The resistor sections 13 and 14 are included in series relation with each other in multiple relation with the circuit including the armature of the exciter E and the generator field winding $Gf$, and this multiple circuit is connected in series relation with the resistor 12 when the controller C is operated so as to connect the field winding $Gf$ to the source of supply 15. The arrangement thus far described is that which is covered broadly and specifically in the heretofore referred to Whiting application which is assigned to the same assignee as is this present application. One of the features of the arrangement described is that the series exciter will provide a compounding effect for the excitation of the generator G so as to take into account the variations in the load on the traction motor. A further feature of the arrangement is that the controller C is able to modify the component of excitation for the field winding $Gf$, so that when the controller is in a position corresponding to a relatively low traction motor speed, the regulating effect of the series exciter will be comparatively greater than when the controller C has been moved to one of its higher speed positions. The resistor section 14 is included in a local circuit with the field winding $Gf$ when the controller is returned to its neutral position, that shown in the drawing, thereby establishing a local discharge circuit for the generator separately excited field winding which effects a smoothness in the retardation characteristics of the traction motor.

In order to provide a regulating effect for the traction motor M such that when there is a relatively rapid change of the flux set up by the generator field winding $Gf$, there will not be occasioned either a too rapid rate of acceleration or a too rapid rate of retardation of the traction motor M, we have provided the auxiliary field winding 16 for the exciter E. This field winding is inductively related to the field of the generator G. As disclosed in the said Whiting application, a local circuited damping field winding is preferably provided for the generator G so as to restrain temporarily rapid changes in the excitation of the generator G so as to thereby obtain smooth acceleration and retardation characteristics for the traction motor M. This damping winding 17 is indicated as being closely associated with the generator field winding Gf. The damping winding 17 may be either wound on the same poles as the field winding Gf or may be wound on separate poles, it being merely necessary that the damping winding be inductively related to the field winding Gf so as to have a current induced therein which varies in response to the rate of change of the field flux of the generator. This damping winding 17 is included in the local circuit with the auxiliary field winding 16 of the exciter, and an adjustable resistor 18 is included in this local circuit so as to adjust the time constant of the local circuit including the field windings 16 and 17.

The flux set up in the auxiliary field winding 16 of the exciter is such as to be differential with respect to the flux set up by the main exciter field winding Ef. In other words, the field winding 16 will tend to neutralize the effect of the exciter field winding Ef so as to resist relatively rapid changes in the regulating effect of the exciter. Because of the fact that this regulating effect is applied directly to the exciter, a promptness in response to the regulation of the acceleration and retardation characteristics of the traction motor is effected, and a promptness in the response of the series exciter in preventing excessive rushes of current in the local circuit including the generator and traction motor armature local circuit, is also effected.

Included in the local circuit in which the field windings 17 and 16 are included, is the winding 19 of an electromagnetic switch 20 which controls the energization of the winding of an electromagnetic friction brake 21 for the traction motor. This switch winding 19 is provided for delaying the setting of the electromagnet brake 21 responsively to the rate of change of the field flux of the generator.

As thus constructed and arranged and with the parts in their respective positions as indicated in the drawing, the operation of our invention is as follows: Assume that it is desired to operate the traction motor M in the hoisting direction. The master controller C will be thrown clockwise to one of its operative positions. The directional contactor 11 will be energized to close and because of the fact that the main winding 22 of the switch 20 is included in series relation with the winding of the directional contactor 11, the switch 20 will also be energized to close its contacts. The closing of the directional contactor 11 connects the separately excited field winding Gf to the source of supply 15 through the armature of the exciter E. The auxiliary switch contact 23 of contactor 11 opens its lower set of contacts and closes its upper set of contacts. The opening of the lower set of contacts effects the opening of the local circuit in which the field winding Gf is included, and the closing of the upper set of contacts connects the resistors 13 and 14 in series with each other in multiple relation with the circuit including the armature of the exciter E and the field winding Gf.

The closing of the switch 20 effects the energization of the winding of the electromagnet brake 21 so as to release this brake from the traction motor. Upon the connection of the generator separately excited field winding to the source 15 through the operation of the controller C, a comparatively high rate of change of the current in the field winding Gf, will be effected. In other words, the current in this field winding circuit will be caused to build up rather rapidly. Because of the fact that the damping winding 17 of the generator is inductively related to the field winding Gf, a current will be induced in the damping winding 17 and this current will energize the auxiliary winding 16 of the exciter so as to regulate the voltage of the exciter E to compensate for the relatively rapid rate of building up of the voltage of the generator G. The winding 19 of switch 20 is also included in the local circuit with the windings 17 and 16, but the effect of the energization of the winding 19 is not made use of at this time in the control of the electromagnet brake. In order to effect an increase in the speed of the traction motor M, the controller C is moved further in a clockwise direction, thereby shunting step by step sections of the resistor 12.

Assume that the motor M is running at its intended speed and that it is desired to stop the motor. The controller C will be returned to its neutral position as indicated, thereby disconnecting the field winding Gf from the source 15 by reason of the opening of the directional contactor 11. The opening of this contactor causes the auxiliary switch 23 thereof to open its upper set of contacts and close its lower set of contacts. The opening of the upper set of contacts effects the disconnection of the armature of the exciter E from the circuit in which the generator field winding Gf is included and the closing of the lower set of contacts effects the connection of the field winding Gf in a local circuit which includes the resistor 14. A relatively high rate of change of the field flux of the generator will be occasioned by this manipulation of the controller C and a current will be induced in the damping winding 17 which will flow through the auxiliary winding 19 of the switch 20 so as to temporarily hold this switch in its closed position, despite the fact that the winding 22 of the switch is disconnected from the source 15 by the return of the controller C to the neutral position. The maintenance of the switch 20 in the closed position is desirable for an interval of time in order to thereby delay the setting of the electromagnet brake 21. By reason of the fact that the auxiliary winding 19 of switch 20 is energized responsively to the rate of change of the field flux of the generator G, when the rate of change of this flux has decreased to a predetermined value, the switch 20 will be caused to open, thereby effecting the setting of the brake 21. This setting of the brake will occur either a short interval prior to the stopping of the traction motor M or practically at the interval of stopping of the traction motor. This is desirable, since wear on the brake is thus minimized and furthermore, the delay in the setting of the brake will prevent the brake setting at such a time as to produce a jerk in the stopping of the traction motor and the elevator driven thereby. The exciter field winding 16 will be effective to counteract the tendency to a too rapid rate of decrease of the field flux of the generator when the controller C is manipulated from a higher to a lower speed position.

It will be understood that in case it is desired to cause the motor M to operate in the lowering direction, the controller will be thrown counter-clockwise and that for this operation the contactor 10 will be closed and its associated auxiliary switch will perform the same function as the auxiliary switch 23 associated with contactor 11. The operation of the remainder of the equipment will be the same as previously described, the auxiliary winding 16 of the exciter operating to correct conditions occasioned by relatively rapid rates of change of the field of the generator G, in the same manner as previously described, and the auxiliary winding 19 of switch 20 serving to delay the opening of this switch to delay the setting of the brake 21 in the same manner as previously explained.

We would have it understood that while we have illustrated and described our invention in connection with a system in which a series exciter is provided for regulating the energization of the generator separately excited field winding, our invention is not so limited but is equally applicable to a Leonard system in which the compounding of the generator is obtained by means of a series field on the generator. Likewise, our invention is also applicable to a Leonard system in which no compounding effect for the generator is had.

Among the advantages of our invention are the following: due to the inherent characteristics of a generator, the rate of building up of the voltage of generator G is the highest at the time the connection of the separately excited field winding Gf to the source 15 and this rate then gradually reduces so that the final rate is materially less than the initial rate. Likewise, when the current in winding Gf is reduced by a suitable operation of controller C, a similar effect is caused in that the highest rate of change occurs at the initiation of the retardation cycle. Since the speed characteristic of the motor M varies with the field characteristic of the generator, our invention effects a more nearly uniform rate of change of the motor speed both during acceleration and retardation. Furthermore, the setting of the electromagnetic brake 20 is automatically controlled so that during retardation, the rate of decrease of the motor speed is maintained substantially uniform practically until the motor stops.

What we claim as new and desire to secure by Letters Patent of the United States, is:

1. In combination, a Leonard drive, means for effecting a braking action on the motor of said drive, and means responsive to the rate of change of the field flux of said generator for automatically regulating the said braking means.

2. In combination, a Leonard drive, a normally applied friction brake for the motor of said drive, the said brake being connected to be released and maintained released while the generator of the drive supplies armature current to the motor of said drive, and means inductively related to the separately excited field winding of the generator of said drive for regulating the application of said brake.

3. In combination, a Leonard drive, a normally applied electromagnetic brake for the motor of said drive, a controller for effecting the connection of the separately excited field winding of said generator and the winding of said brake to a source of supply to cause the motor of said drive to be supplied with armature current from the generator of the drive and to effect the release of said brake, and means energized responsively to the rate of change of the field flux of said generator for governing the time of application of said brake after said controller is operated to disconnect said generator field winding and said brake winding from said source.

4. A system of electrical control comprising an electric motor, an electric generator for supplying the armature current for said motor, control means for adjusting the field strength of said generator, means for effecting a braking action on said motor and means responsive to the rate of change of the field flux of said generator for regulating said braking means.

In witness whereof, we have hereunto set our hands this 8th day of December 1927.

BENJAMIN W. JONES.
CHARLES B. CONNELY.